(12) United States Patent  
Gupta

(10) Patent No.: US 9,083,775 B2  
(45) Date of Patent: Jul. 14, 2015

(54) ANDSF POLICIES FOR WLAN AND PLMN SELECTION

(71) Applicant: Intel Corporation, Santa Clara, CA (US)

(72) Inventor: Vivek Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 13/895,261

(22) Filed: May 15, 2013

(65) Prior Publication Data

US 2014/0092886 A1    Apr. 3, 2014

Related U.S. Application Data

(60) Provisional application No. 61/707,784, filed on Sep. 28, 2012.

(51) Int. Cl.
*H04W 4/00* (2009.01)
*H04L 29/06* (2006.01)
(Continued)

(52) U.S. Cl.
CPC ............... *H04L 65/602* (2013.01); *H04B 5/00* (2013.01); *H04J 3/1694* (2013.01); *H04L 5/0057* (2013.01); *H04L 5/0073* (2013.01);
(Continued)

(58) Field of Classification Search
CPC ....... H04L 65/60; H04L 65/602; H04L 67/10; H04L 5/14; H04L 5/0057; H04W 52/0261; H04W 52/0212; H04W 72/0486; H04W 72/042; H04W 72/02; H04W 72/0406; H04W 72/0413; H04W 28/08; H04W 48/20; H04W 48/16; H04W 48/14; H04W 48/18; H04W 36/22; H04W 36/08; H04W 24/10; H04W 24/08; H04W 76/025; H04W 40/246; H04J 3/1694; H04B 5/00; Y02B 60/50
USPC ......... 370/328–329, 331–333, 338, 341, 437, 370/442–444, 465; 455/436–439, 442
See application file for complete search history.

(56) References Cited

U.S. PATENT DOCUMENTS 8,185,152 B1 * 5/2012 Goldner ..................... 455/552.1
2010/0003980 A1 * 1/2010 Rune et al. ..................... 455/436
(Continued)

FOREIGN PATENT DOCUMENTS

WO    2009146741 A1    12/2009

OTHER PUBLICATIONS

AT&T, et al. "Key Issue of Intelligent WLAN Network Selection Policies," 3GPP SA WG2 Meeting #93, S2-123501, WLAN_NSUE / Rel-12, Oct. 8-12, 2012, Sofia, Bulgaria, 2 pages.
(Continued)

*Primary Examiner* — Kevin Mew
(74) *Attorney, Agent, or Firm* — Schwabe, Williamson & Wyatt, P.C.

(57) ABSTRACT

In embodiments, a user equipment (UE) may be able to identify one or more access network discovery and selection function (ANDSF) policies which the UE can use to select a wireless local area network (WLAN) and/or a WLAN access point (AP) to which the UE should connect. The UE may then be able to use the identified ANDSF policy or policies to select the WLAN and/or WLAN AP prior to selection, by the UE, of a WLAN public land mobile network (PLMN) to which the UE should connect.

20 Claims, 5 Drawing Sheets

(51) Int. Cl.
| | |
|---|---|
| H04W 72/04 | (2009.01) |
| H04W 28/08 | (2009.01) |
| H04W 48/20 | (2009.01) |
| H04W 36/22 | (2009.01) |
| H04J 3/16 | (2006.01) |
| H04W 72/02 | (2009.01) |
| H04W 24/10 | (2009.01) |
| H04W 48/16 | (2009.01) |
| H04W 76/02 | (2009.01) |
| H04W 24/08 | (2009.01) |
| H04W 40/24 | (2009.01) |
| H04L 29/08 | (2006.01) |
| H04B 5/00 | (2006.01) |
| H04L 5/00 | (2006.01) |
| H04W 48/14 | (2009.01) |
| H04L 5/14 | (2006.01) |
| H04W 52/02 | (2009.01) |
| H04W 36/08 | (2009.01) |
| H04W 48/18 | (2009.01) |

(52) U.S. Cl.
CPC ............... *H04L 5/14* (2013.01); *H04L 65/60* (2013.01); *H04L 67/10* (2013.01); *H04W 24/08* (2013.01); *H04W 24/10* (2013.01); *H04W 28/08* (2013.01); *H04W 36/22* (2013.01); *H04W 40/246* (2013.01); *H04W 48/14* (2013.01); *H04W 48/16* (2013.01); *H04W 48/20* (2013.01); *H04W 52/0212* (2013.01); *H04W 72/02* (2013.01); *H04W 72/042* (2013.01); *H04W 72/0406* (2013.01); *H04W 72/0413* (2013.01); *H04W 72/0486* (2013.01); *H04W 76/025* (2013.01); *H04W 36/08* (2013.01); *H04W 48/18* (2013.01); *H04W 52/0261* (2013.01); *Y02B 60/50* (2013.01)

(56) References Cited

U.S. PATENT DOCUMENTS

| | | | | |
|---|---|---|---|---|
| 2010/0208698 | A1* | 8/2010 | Lu et al. | 370/331 |
| 2010/0265893 | A1* | 10/2010 | Dwyer et al. | 370/329 |
| 2011/0085498 | A1* | 4/2011 | Oba et al. | 370/328 |
| 2011/0110300 | A1* | 5/2011 | Sachs et al. | 370/328 |
| 2011/0170517 | A1* | 7/2011 | Bakker et al. | 370/331 |
| 2012/0026933 | A1* | 2/2012 | Aso et al. | 370/315 |
| 2012/0063428 | A1* | 3/2012 | Ng et al. | 370/338 |
| 2012/0079084 | A1* | 3/2012 | Forssell et al. | 709/221 |
| 2012/0093031 | A1* | 4/2012 | Wang et al. | 370/254 |
| 2012/0196644 | A1* | 8/2012 | Scherzer et al. | 455/524 |
| 2012/0264412 | A1* | 10/2012 | Tervonen et al. | 455/418 |
| 2013/0003697 | A1* | 1/2013 | Adjakple et al. | 370/331 |
| 2013/0012182 | A1* | 1/2013 | Liao | 455/418 |
| 2013/0034019 | A1* | 2/2013 | Mustajarvi | 370/254 |
| 2013/0089076 | A1* | 4/2013 | Olvera-Hernandez et al. | 370/332 |
| 2013/0242965 | A1* | 9/2013 | Horn et al. | 370/338 |

OTHER PUBLICATIONS

International Search Report and Written Opinion for PCT Application No. PCT/US2013/061487, dated Jan. 2, 2014, 9 Pgs.

Bari, Farooq and Leung, Victor, Automated Network Selection in a Heterogeneous Wireless Network Environment, 2007 IEEE, pp. 34-40.

* cited by examiner

ANDSF POLICIES FOR WLAN AND PLMN SELECTION

CROSS REFERENCE TO RELATED APPLICATIONS

The present application claims priority to U.S. Provisional Patent Application No. 61/707,784, filed Sep. 28, 2012, entitled "Advanced Wireless Communication Systems and Techniques," the entire disclosure of which is hereby incorporated by reference in its entirety.

FIELD

Embodiments relate to wireless networks and, more particularly, apparatuses, methods and storage media for utilizing an access network discovery and selection function policies in such wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Wireless local area network (WLAN) public land mobile network (PLMN) selection was introduced in Release 6 of 3GPP specifications for interworking between third generation partnership project (3GPP) and WLAN systems as part of the interworking-WLAN (i-WLAN) architecture specified in 3GPP technical specifications (TSs) such as TS 22.234, TS 23.234, TS 24.234. In those technical specifications, a user equipment (UE) may be directed to select a service provider or PLMN which may provide services to a WLAN. These services may include services such as basic connectivity to the internet, or other services such as Internet Protocol (IP) Multimedia System services (IMS), Voice over IP (VoIP), video on demand (VOD), media/content streaming, etc. In Release 8 of the 3GPP specifications, access network discovery and selection function (ANDSF) policies were introduced that could be used to modify PLMN selection for a WLAN as specified in the i-WLAN architecture.

Currently, to allow the concepts introduced by Release 6 and Release 8 to coexist, PLMN selection may occur first, and then application of the ANDSF policies may occur to select the WLAN or WLAN AP in the i-WLAN architecture. However, a Service Provider/PLMN may only be connected to a single WLAN network. Therefore, by selecting the Service Provider/PLMN, the WLAN network, which may for example be identified by one or more service set identifiers (SSIDs) and/or WLAN APs, may be selected by default.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Apparatuses, methods, and storage media are described herein for allowing a UE to consider an ANDSF policy during selection of a WLAN based on the i-WLAN architecture to which the UE should connect. In embodiments, the UE may be able to consider the ANDSF policy during selection of the WLAN without first selecting a PLMN to which the UE should connect. In some embodiments, the UE may first connect to the WLAN network using the i-WLAN architecture based at least in part on the ANDSF policy and then select a PLMN to which the UE should connect based at least in part on the selected WLAN network. In other embodiments, the UE may not select a PLMN after selecting the WLAN network.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
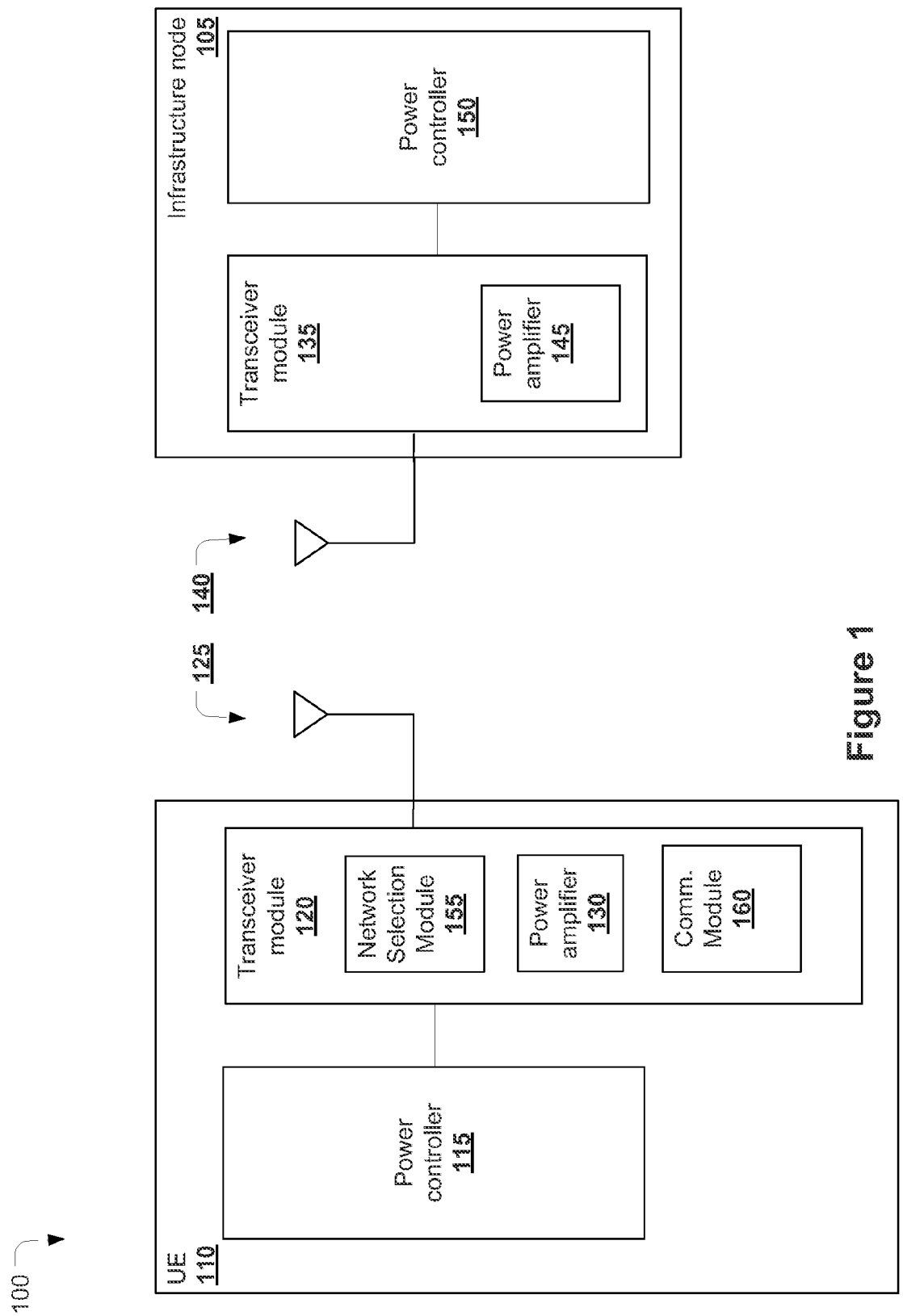
FIG. 1 schematically illustrates a high-level example of a network system comprising a UE and a base station, in accordance with various embodiments.

FIG. 1 schematically illustrates a wireless communication network 100 in accordance with various embodiments. Wireless communication network 100 (hereinafter "network 100") may be a cellular network, for example a 3GPP long term evolution (LTE) network such as an evolved universal terrestrial radio access network (E-UTRAN). In other embodiments, the network 100 may be a WLAN such as an IEEE 802.11 Wi-Fi network. The network 100 may include an infrastructure node 105, for example, an enhanced node B (eNB), configured to wirelessly communicate with a UE 110. In embodiments, the infrastructure node 105 may be a WLAN AP belonging to a WLAN network that interworks with the 3GPP system per the i-WLAN architecture. As used herein, WLANs and WLAN APs may be using or based on the above-described i-WLAN architecture unless otherwise noted.

As shown in FIG. 1, the UE 110 may include a transceiver module 120. The transceiver module 120 may be further coupled with an antenna 125 of the UE 110 for communicating wirelessly with other components of the network 100, e.g., infrastructure node 105. The antenna 125 may be powered by a power amplifier 130, which may be a component of the transceiver module 120, as shown in FIG. 1, or may be a separate component of the UE 110. In one embodiment, the power amplifier 130 provides the power for all transmissions on the antenna 125. In other embodiments, there may be multiple power amplifiers, multiple antennas, or both, on the UE 110. In embodiments, the UE 110 may include a network selection module 155 which may include one or more processors or controllers. The network selection module 155 may be part of the transceiver module 120 as shown, while in other embodiments the network selection module 155 may be separate from the transceiver module 120. The network selection module 155 may be configured to select one or more WLANs or WLAN APs to which the UE 110 should connect. If the UE 110 has the option of selecting multiple WLANs and/or WLAN APs simultaneously, the network selection module 155 may be configured to determine which of the WLANs and/or WLAN APs the UE 110 should select. In embodiments, the network selection module 155 may be hardware, software, firmware, or some other type of logic configured to perform the processes described herein.

Further, as shown in FIG. 1, the UE 110 may include a communication module 160, as shown in FIG. 1. In some embodiments the communication module 160 may be part of the transceiver module 120, while in other embodiments the communication module 160 may be separate from the transceiver module 120. In embodiments, the communication module 160 may be coupled with the network selection module 155, and configured to cause the antenna 120 to transmit or receive wireless signals, for example to or from infrastructure node 105.

The infrastructure node 105 may include a transceiver module 135 coupled with an antenna 140 of the infrastructure node 105 for communicating wirelessly with a network component such as the UE 110. The infrastructure node 105 may further include a power amplifier 145 coupled with the transceiver module 135 and a power controller 150. In one embodiment, the power amplifier 145 provides the power for all transmissions on the antenna 140. In other embodiments, there may be multiple power amplifiers or multiple antennas, or both, on the infrastructure node 105.

Figure 2:
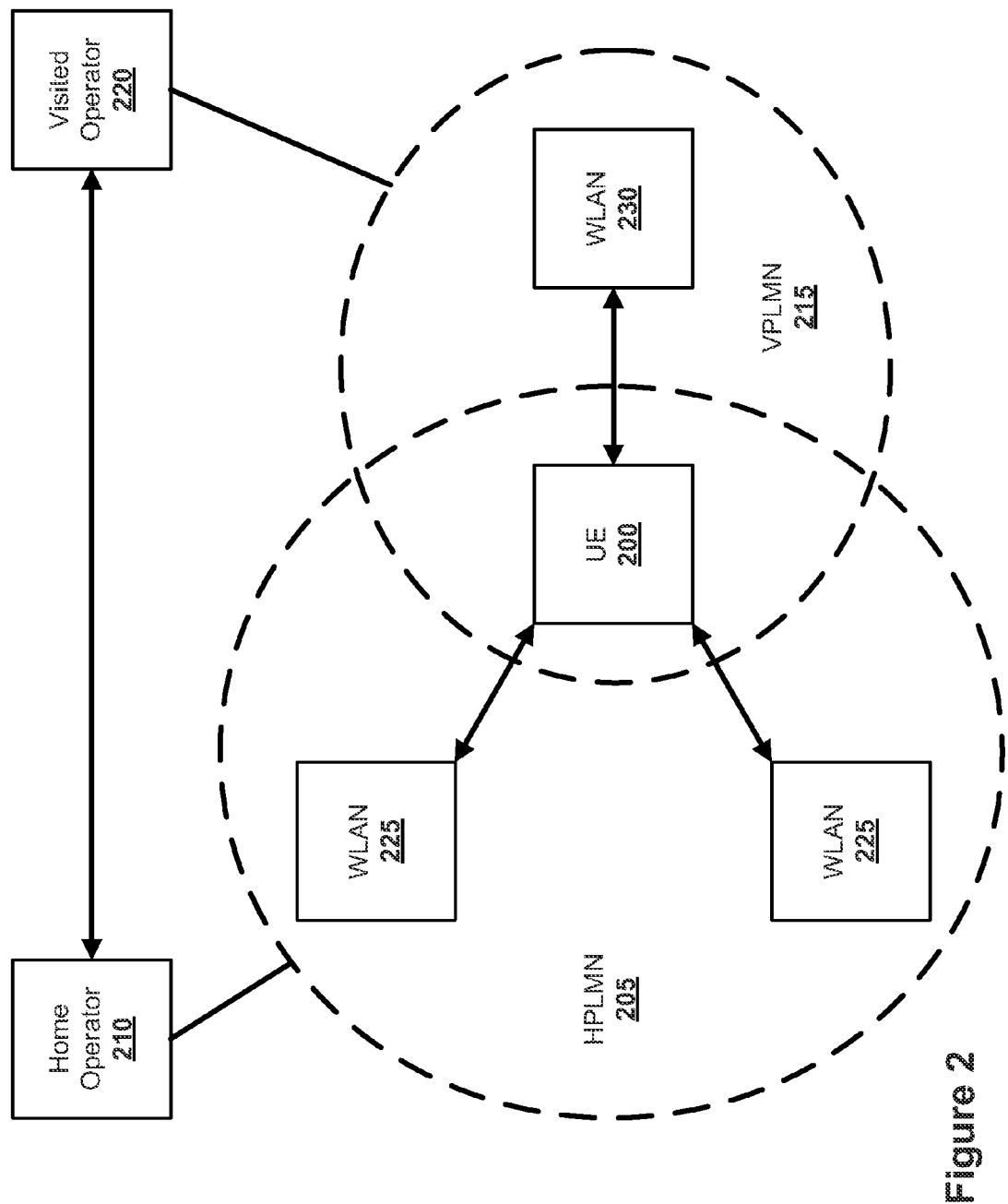
FIG. 2 illustrates an example of a network topology including a plurality of PLMNs, in accordance with various embodiments.

FIG. 2 illustrates an example of a network topology. In embodiments, the UE 200, which may be similar to UE 110 described above, is within range of two separate PLMNs, the home PLMN (HPLMN) 205 operated by the UE's home operator 210, and the visited PLMN (VPLMN) 215 operated by a visited operator 220. In embodiments, the home operator 210 and/or the visited operator 220 may be entities such as telecommunications or cellular companies, businesses such as coffee shops, or some other type of service provider or network operator. In embodiments, the home operator 210 may be an entity with whom the UE 200 has a subscription or other type of business relationship. In embodiments, the HPLMN 205 or the home operator 210 may provide credentials to the UE 200 that may allow the UE to connect to the HPLMN 205 or a network operated by the HPLMN such as a WLAN network per the i-WLAN architecture. By contrast, the visited operator 220 may be an operator with whom the UE 200 does not have a subscription or business relationship or credentials. However, the UE 200 may be able to connect to the HPLMN 205 or the VPLMN 215 based on the credentials provided by the HPLMN 205.

When connected to the HPLMN 205, the UE 200 may be said to be on its "home" network. When connected to the VPLMN 215, the UE 200 may be said to be on its "roaming" or "visited" network. In some embodiments, the home operator 210 may have an agreement or contract with the visited operator 220. For example, in some embodiments the home operator 210 may have an agreement with the visited operator 220 such that UEs of the home operator 210, for example UE 200, may have access to the VPLMN 215. For example, the VPLMN 215 or visited operator 220 may verify credentials of the UE 200 with the HPLMN 205 or home operator 210 before granting the UE 200 access to the VPLMN 215. The verification may involve determining whether the UE 200 has credentials supplied by the HPLMN 205 and/or the home operator 210, and whether the credentials grant the UE 200 access to the VPLMN 215. In embodiments, the home operator 210 and the visited operator 220 may have a preexisting relationship regarding, for example, how much the visited operator 220 may charge the home operator 210 for granting the UE 200 access to the VPLMN 215. These charges may be an element of the original subscription agreement between the user of the UE 200 and the home operator 210. In this way, the VPLMN 215 may be configured, based on the agreement between the home operator 210 and the visited operator 220, to handle overflow for the HPLMN 205.

As shown in FIG. 2, a PLMN such as HPLMN 205 may have a plurality of WLANs 225 configured to interwork with the HPLMN 205 per the i-WLAN interworking architecture. Each of the WLANs 225 may have one or more WLAN APs (not shown). A PLMN such as VPLMN 215 may also be connected to a WLAN 230 configured to interwork with the VPLMN 215 per the i-WLAN architecture. Similarly to the WLANs 225, in embodiments the WLAN 230 may have one or more WLAN APs (not shown). Even though the HPLMN 205 is shown with two WLANs 225, and the VPLMN 215 is shown with a single WLAN 230, in other embodiments the HPLMN 205 may be connected to only a single WLAN 225, or more than two WLANs 225. Similarly, the VPLMN 215 may be connected to two or more WLANs 230.

To connect to the HPLMN 205, the UE 200 may be configured to connect to one or more WLAN APs of WLAN networks 225 that interwork with HPLMN 205 per the i-WLAN architecture or some other architecture. Similarly, the UE 200 may be configured to connect to one or more WLAN APs of WLAN networks 230 that interwork with the VPLMN 215 per the i-WLAN architecture or some other similar architecture. In embodiments, the WLAN AP(s) of WLAN(s) 225 or 230 may be identifiable to the UE 200 based on an SSID, WLAN specific identifier (WSID), a network access identifier (NAI), an organizationally unique identifier (OUI), or some other identifier of the WLAN and/or an AP of the WLAN. As described above, Release 6 of the 3GPP specifications provided the concept of PLMN selection by a UE. In some cases, the PLMN selection as specified by Release 6 of the 3GPP specifications may use an ordered list of preferred SSIDs of APs in the WLANs as an input. However, the ANDSF policies introduced by Release 8 of the 3GPP specifications, as described above, may be used to provide more detailed rules regarding selection of a WLAN network interworking with the PLMN based on the i-WLAN architecture to which the UE should connect. For example, the ANDSF policies may describe different behavior based on WLAN selection policies based on parameters such as time of day, location of the UE, load on the networks or some other parameter.

In order to combine the Release 6 PLMN selection rules and the Release 8 ANDSF policy parameters, current WLAN network selection procedures may rely on first selecting the PLMN and then using ANDSF policies in the selection of a WLAN network within the selected PLMN. For example, an existing PLMN and WLAN selection process may be as follows.

1) The UE may determine each WLAN to which the UE may connect, and possibly a priority order for each WLAN, based on the SSID or WSID of the WLAN APs in the WLAN.
2) For each SSID/WSID encountered, the UE may determine which PLMN(s) are connected to the WLANs identified by the SSID/WSID.
3) The identified PLMNs may be prioritized in the order of: HPLMN, highest priority equivalent HPLMN among those that are available, PLMN in the "i-WLAN last registered PLMN" data element in the universal subscriber identity module (USIM) of the UE, PLMNs in the "User controlled PLMN selector for i-WLAN access" data file in the USIM/mobile equipment (ME), PLMNs in the "Operator controlled PLMN selector for i-WLAN access" data file in the USIM/ME, and finally any other PLMN in random order. The PLMN with the highest priority according to the above described priority order may be selected by the UE.
4) Once a PLMN is selected, the UE may determine the SSIDs/WSIDs of WLANs or WLAN APs that are connected to that PLMN. The UE may then apply one or more ANDSF policies to the WLANs and/or WLAN APs and determine, based on the ANDSF policies, the WLANs and/or WLAN APs to which the UE should connect. Notably, in these current policies, the UE may only apply the ANDSF policies to the WLAN networks and/or WLAN APs of the WLAN networks that are in the previously selected PLMN. As noted above with respect to FIG. 2, however, a PLMN such as the HPLMN 205 and VPLMN 215 may only be connected to a single WLAN network, for example WLAN 230.
5) Upon successful authentication and connection to the selected WLAN or WLAN AP, the UE may indicate to a user of the UE which WLAN, WLAN AP and/or PLMN the UE selected and/or is connected to. The UE may further store the PLMN in the USIM/ME of the UE. If authentication is not successful, then the UE's behavior may be implementation dependent.

As can be seen according to the above-described list, in current implementations the use of the ANDSF policies may not be necessary. For example, if the PLMN is only connected to a single WLAN, then selection of the WLAN may occur by default when the UE selects the PLMN.

Figure 3:
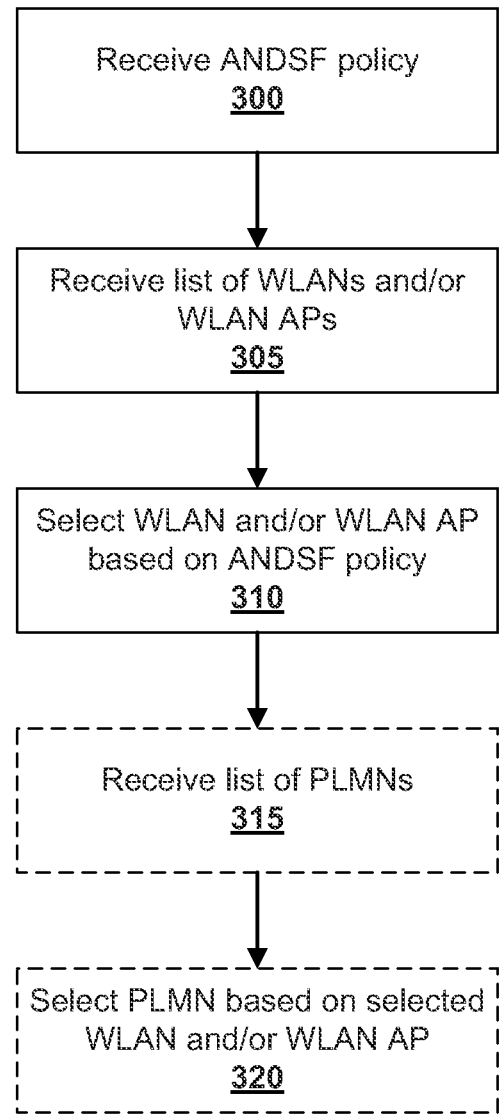
FIG. 3 illustrates an example process for selecting a WLAN network, in accordance with various embodiments.

FIG. 3 depicts an example of a process which could occur in a UE such as UE 200 to more efficiently use an ANDSF policy. In the process in FIG. 3, the UE may first identify one or more ANDSF policies at 300. In some embodiments, the ANDSF policies may be constructed by the network operator such as the home operator 210 and/or the visited operator 220 and supplied to the UE. In other embodiments, the UE may be pre-loaded or pre-provisioned with one or more ANDSF policies. In some embodiments, the ANDSF policy may be an inter-system mobility policy (ISMP) and/or an inter-system routing policy (ISRP).

The UE may also receive a list of WLANs and/or WLAN APs to which the UE can connect at 305. For example, the list of WLANs and/or WLAN APs may be the result of the UE scanning for SSIDs and/or WSIDs in the vicinity of the UE. The UE may then apply one or more ANDSF policies to select a WLAN and/or WLAN AP in the received list of WLANs and/or WLAN APs at 310. Notably, the UE may be able to select a WLAN and/or WLAN AP based on the ANDSF policy without first determining a PLMN to which the UE should connect.

In embodiments, the UE may then receive a list of PLMNs at 315. The list of PLMNs may be the result of determining the PLMN that is connected to each identified WLAN and/or WLAN AP supports. In some embodiments, the list of PLMNs received at 315 may occur before the selection of the WLAN and/or WLAN AP based on the ANDSF policy at 310. However, in these embodiments, the selection of the WLAN and/or WLAN AP based on the ANDSF policy may still occur without first selecting a PLMN to which the UE should connect.

The UE may optionally select the PLMN to which the UE should connect out of the list of identified PLMNs at 320. In embodiments, the selection of the PLMN may be based on the selection of the WLAN and/or WLAN AP based on the ANDSF policy.

As an example of a use case for when the process of FIG. 3 may be triggered, an operator, for example the UE's home operator, may not provide any WLAN information (e.g., a list of SSIDs of WLAN APs in the WLAN) to the UE in the i-WLAN management object (MO) or the USIM of the UE. In some embodiments, the operator may not even provide the i-WLAN MO to the UE. Therefore, the UE may use the process of FIG. 3 to determine a WLAN, WLAN AP and/or a PLMN to which the UE should connect.

It will be recognized that the above-described process may provide several significant advantages. Specifically, ANDSF policies may have more parameters than the current procedure for selecting a PLMN and/or WLAN. Therefore the use of ANDSF policies could allow for more context sensitive selection of WLANs, WLAN APs, and/or PLMNs on the part of the UE.

As an example use case, a UE, for example UE 200 in FIG. 2, may be able to access a WLAN AP of WLAN 225 connected to the HPLMN 205. Additionally, the UE may be able to access a WLAN AP of WLAN 230 connected to the VPLMN 215. In embodiments, the UE 200 may identify an ANDSF policy, for example an ANDSF policy supplied from the UE's home operator 210, that directs the UE 200 to connect to the WLAN 230 of the VPLMN 215 based in part on a WLAN selection parameter such as a given time window. Such a direction may be additionally dependent on another WLAN selection parameter, for example the location of the UE 200. Using the current PLMN selection procedure described above, where the UE 200 may first select the PLMN and then select the WLAN and/or WLAN AP corresponding to that PLMN, the UE 200 may connect to a WLAN 225 of the HPLMN 205, contrary to the directions of the ANDSF policy. However, using the process described above in FIG. 3, the UE 200 would instead connect to the WLAN 230 of the VPLMN 215 during the given time window, as directed by the ANDSF policy.

This use case may be appropriate, for example, if the home operator 210 has an agreement with the visited operator 220 for the VPLMN 215 to handle overflow for the HPLMN 205.

The home operator 210 may then supply the ANDSF policy to the UE 200, or the UE 200 may be pre-provisioned with the ANDSF policy. The policy may direct the UE 200 to couple with the VPLMN 215, thereby reducing load and congestion of the HPLMN 205. HPLMN 205 load and congestion may be caused, for example, due to rush hour in an urban area where there is a large influx of UEs during a short time period or, for example, when a plane arrives at an airport.

As described above with respect to FIG. 3, receiving the list of PLMNs at 315 and selection of a PLMN at 320 may be optional. In another use case, and with reference to FIG. 2 shown above, the UE 200 may be able to access both WLANs 225 and 230. Generally, PLMN selection may currently be considered when the UE 200 activates its WLAN interface and has not selected a PLMN over any other radio access period, e.g., during power up or after recovery from lack of coverage. However, in some cases, PLMN selection may detrimentally affect the user experience. For example, PLMN selection may obstruct IP flow mobility scenarios or impede the enforcement of operator access selection or steering policies. Therefore, in these situations, PLMN selection may not be required or may be otherwise undesirable. Therefore, in embodiments where a UE receives a specific access steering policy, e.g., an ANDSF policy, from an operator, the UE may not perform PLMN selection.

Although in some embodiments the ANDSF policies may be provided by a home operator such as home operator 210 of the UE 200, in some embodiments the ANDSF policy may be provided by the visited operator 220. For example, in some embodiments the home operator 210 may choose to either allow or forbid the visited operator 220 to provide ANDSF policies to the UE 200. The home operator 210 may signal this decision, for example using the "i-WLAN HPLMN Priority Indication" flag as defined by 3GPP Technical Specification 24.234 v11.3.0, published in June of 2012. If the home operator 210 allows the visited operator 220 to provide ANDSF policies, then the UE 200 may follow the ANDSF policy of the visited operator 220 when the UE is only able to connect to WLAN 230 of a VPLMN 215. However, if the home operator 210 chooses not to allow the UE 200 to use ANDSF policies of the visited operator 220, the UE 200 may only use ANDSF policies supplied from the home operator 210, regardless of whether the UE 200 is roaming or not.

Figure 4:
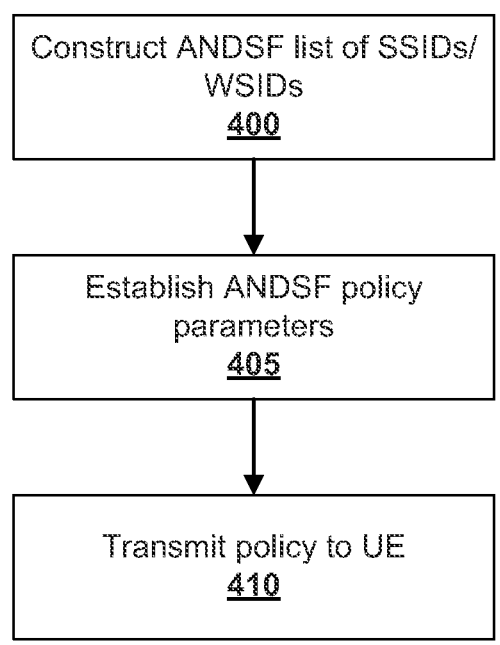
FIG. 4 illustrates an example of constructing an ANDSF policy, in accordance with various embodiments.

FIG. 4 represents an example of a process that may be taken by an operator such as the home operator 210 or the visited operator 220 to construct an ANDSF policy. In embodiments, the operator may first construct an ANDSF policy including SSIDs/WSIDs of WLANs and/or WLAN APs at 400. The operator may then establish additional parameters related to selection of the WLANs and/or WLAN APs at 405. In embodiments, the additional parameters may include parameters such as time of day, location, SSID/WSID priority, or other parameters. The operator may then transmit the policy to the UE at 410. In some embodiments, the operator may also transmit instructions to the UE to follow the ANDSF policy before or instead of any PLMN selection directives that the UE may have received.

Figure 5:
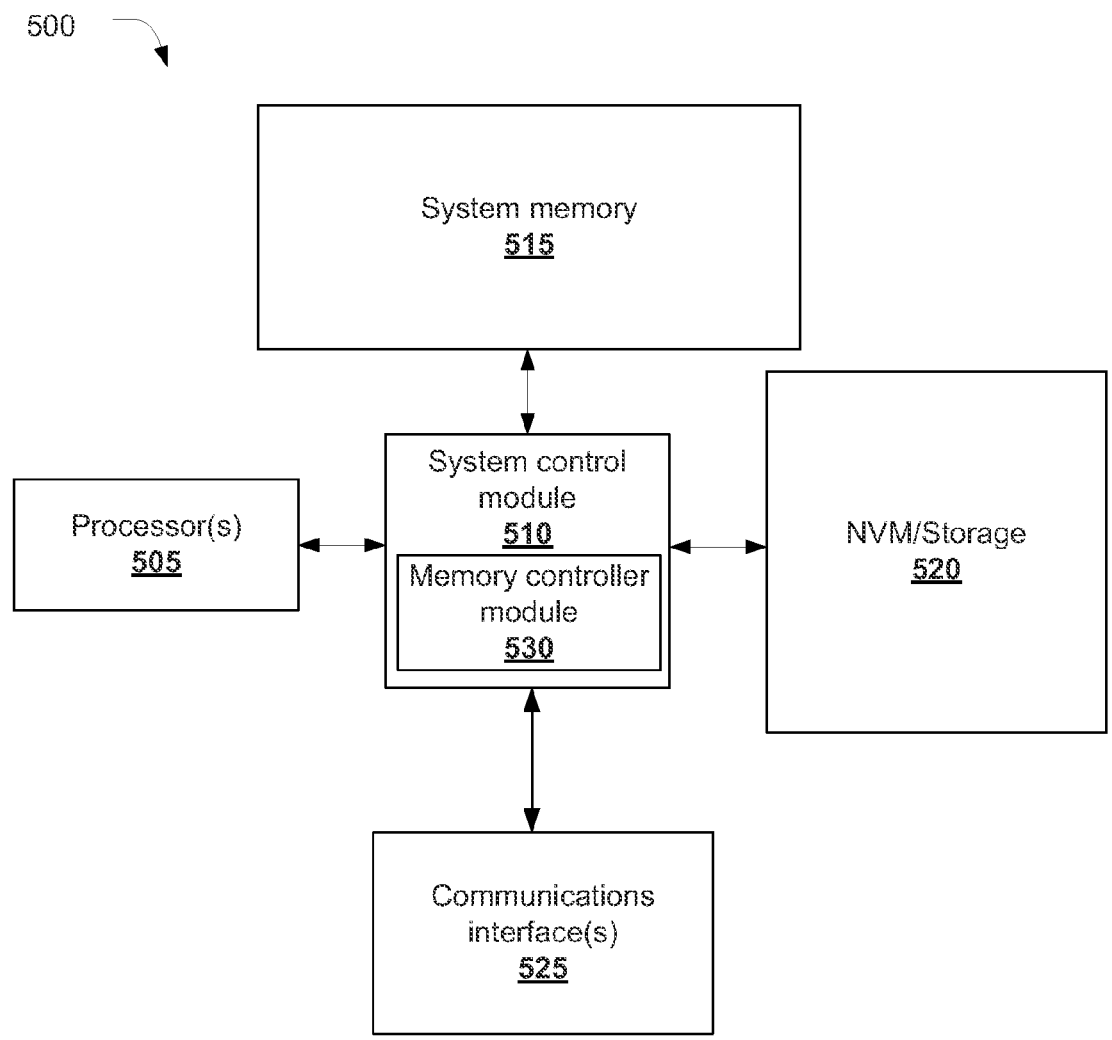
FIG. 5 schematically illustrates an example system that may be used to practice various embodiments described herein.

Embodiments of the present disclosure may be implemented into a system using any suitable hardware and/or software to configure as desired. FIG. 5 schematically illustrates an example system 500 that may be used to practice various embodiments described herein. FIG. 5 illustrates, for one embodiment, an example system 500 having one or more processor(s) 505, system control module 510 coupled to at least one of the processor(s) 505, system memory 515 coupled to system control module 510, non-volatile memory (NVM)/storage 520 coupled to system control module 510, and one or more communications interface(s) 525 coupled to system control module 510.

In some embodiments, the system 500 may be capable of functioning as the UEs 110 or 200 as described herein. In other embodiments, the system 500 may be capable of functioning as the infrastructure node 105 depicted in the embodiment shown in FIG. 1 or any one of the other described embodiments. In some embodiments, the system 500 may include one or more computer-readable media (e.g., system memory or NVM/storage 520) having instructions and one or more processors (e.g., processor(s) 505) coupled with the one or more computer-readable media and configured to execute the instructions to implement a module to perform actions described herein.

System control module 510 for one embodiment may include any suitable interface controllers to provide for any suitable interface to at least one of the processor(s) 505 and/or to any suitable device or component in communication with system control module 510.

System control module 510 may include memory controller module 530 to provide an interface to system memory 515. The memory controller module 530 may be a hardware module, a software module, and/or a firmware module.

System memory 515 may be used to load and store data and/or instructions, for example, for system 500. System memory 515 for one embodiment may include any suitable volatile memory, such as suitable DRAM, for example. In some embodiments, the system memory 515 may include double data rate type four synchronous dynamic random-access memory (DDR4 SDRAM).

System control module 510 for one embodiment may include one or more input/output (I/O) controller(s) to provide an interface to NVM/storage 520 and communications interface(s) 525.

The NVM/storage 520 may be used to store data and/or instructions, for example. NVM/storage 520 may include any suitable non-volatile memory, such as flash memory, for example, and/or may include any suitable non-volatile storage device(s), such as one or more hard disk drive(s) (HDD (s)), one or more compact disc (CD) drive(s), and/or one or more digital versatile disc (DVD) drive(s), for example.

The NVM/storage 520 may include a storage resource physically part of a device on which the system 500 may be installed or it may be accessible by, but not necessarily a part of, the device. For example, the NVM/storage 520 may be accessed over a network via the communications interface(s) 525.

Communications interface(s) 525 may provide an interface for system 500 to communicate over one or more network(s) and/or with any other suitable device. The system 500 may wirelessly communicate with the one or more components of the wireless network in accordance with any of one or more wireless network standards and/or protocols.

For one embodiment, at least one of the processor(s) 505 may be packaged together with logic for one or more controller(s) of system control module 510, e.g., memory controller module 530. For one embodiment, at least one of the processor(s) 505 may be packaged together with logic for one or more controllers of system control module 510 to form a System in Package (SiP). For one embodiment, at least one of the processor(s) 505 may be integrated on the same die with logic for one or more controller(s) of system control module 510. For one embodiment, at least one of the processor(s) 505 may be integrated on the same die with logic for one or more controller(s) of system control module 510 to form a System on Chip (SoC).

In various embodiments, the system 500 may be, but is not limited to, a server, a workstation, a desktop computing device, or a mobile computing device (e.g., a laptop computing device, a handheld computing device, a tablet, a netbook, a smart phone, a gaming console, etc.). In various embodiments, the system 500 may have more or less components, and/or different architectures. For example, in some embodiments, the system 500 includes one or more of a camera, a keyboard, liquid crystal display (LCD) screen (including touch screen displays), non-volatile memory port, multiple antennas, graphics chip, application-specific integrated circuit (ASIC), and speakers.

The various embodiments of the present disclosure have been described including, but are not limited to:

Example 1, which may include a user equipment (UE) configured to select a wireless local area network (WLAN) access point (AP), the UE including: a network selection module to access an access network discovery and selection function (ANDSF) policy; and a communication module coupled with the network selection module, the communication module to: receive an indication of a WLAN AP of WLAN that interworks with a visited operator of a visited public land mobile network (VPLMN) of the UE; and transmit a request to connect the UE to the WLAN AP of the WLAN network that interworks with the visited operator based at least in part on the ANDSF policy.

Example 2 may include the subject matter of Example 1, and further specify that the ANDSF policy is an ANDSF policy of a home operator of a home public land mobile network (HPLMN) of the UE.

Example 3 may include the subject matter of example 1, and further specify that the ANDSF policy is an ANDSF policy of the visited operator.

Example 4 may include the subject matter of example 1, and further specify that the communication module is further to transmit a request to connect to the VPLMN based at least in part on the ANDSF policy.

Example 5 may include the subject matter of any of examples 1-4, and further specify that the ANDSF policy includes a WLAN selection parameter including a location of the UE, a time of day, or load on a home public land mobile network (HPLMN) of the UE.

Example 6 may include the subject matter of any of examples 1-4, and further specify that the ANDSF policy includes an inter-system mobility policy (ISMP) or an inter-system routing policy (ISRP).

Example 7 may include the subject matter of any of examples 1-4, and further specify that the UE further includes a power supply coupled with the network selection module.

Example 8 may include a method of selecting a wireless local area network (WLAN), the method including: accessing, by a user equipment (UE), an access network discovery and selection function (ANDSF) policy; receiving, by the UE, an indication of a WLAN; selecting, by the UE and based at least in part on the ANDSF policy, the WLAN as a selected WLAN; receiving, by the UE, an indication of a public land mobile network (PLMN); and selecting, by the UE and based at least in part on the selected WLAN, the PLMN.

Example 9 may include the subject matter of example 8, and further specify that the indication of the WLAN is a service set identifier (SSID) of an access point (AP) of the WLAN.

Example 10 may include the subject matter of examples 8 or 9, and further specify that the ANDSF policy includes a WLAN selection parameter including a location of the UE or a time of day.

Example 11 may include the subject matter of examples 8 or 9, and further specify that the ANDSF policy includes an inter-system mobility policy (ISMP) or an inter-system routing policy (ISRP).

Example 12 may include the subject matter of examples 8 or 9, and further specify that the ANDSF policy is a third generation partnership project (3GPP) ANDSF policy.

Example 13 may include the subject matter of examples 8 or 9, and further include receiving, by the UE, the ANDSF policy from an operator of a home network of the UE.

Example 14 may include the subject matter of examples 8 or 9, and further include receiving, by the UE, the ANDSF policy from an operator of a roaming network of the UE.

Example 15 may include an apparatus configured to select a wireless local area network (WLAN), the apparatus including: means to access an access network discovery and selection function (ANDSF) policy; means to receive an indication of the wireless local area network WLAN; means to select, based at least in part on the ANDSF policy, the WLAN as a selected WLAN; means to receive an indication of a public land mobile network (PLMN); and means to select, based at least in part on the selected WLAN, the PLMN.

Example 16 may include the subject matter of example 15, and further specify that the indication of the WLAN is a service set identifier (SSID) of an access point (AP) of the WLAN.

Example 17 may include the subject matter of examples 15 or 16, and further specify that the ANDSF policy includes a WLAN selection parameter including a location of the UE or a time of day.

Example 18 may include the subject matter of examples 15 or 16, and further specify that the ANDSF policy includes an inter-system mobility policy (ISMP) or an inter-system routing policy (ISRP).

Example 19 may include the subject matter of examples 15 or 16, and further specify that the ANDSF policy is a third generation partnership project (3GPP) ANDSF policy.

Example 20 may include the subject matter of examples 15 or 16, and further means to receive the ANDSF policy from an operator of a home network of the UE.

Example 21 may include the subject matter of examples 15 or 16, and further include means to receive the ANDSF policy from an operator of a roaming network of the UE.

Example 22 may include one or more computer readable media including instructions to select a wireless area network (WLAN), the instructions to, upon execution of the instructions by a computing device, cause the computing device to: access an access network discovery and selection function (ANDSF) policy; receive an indication of the WLAN; select, based at least in part on the ANDSF policy, the WLAN as a selected WLAN; receive an indication of a public land mobile network (PLMN); and select, based at least in part on the selected WLAN, the PLMN.

Example 23 may include the subject matter of example 22, and further specify that the indication of the WLAN is a service set identifier (SSID) of an access point (AP) of the WLAN.

Example 24 may include the subject matter of examples 22 or 23, and further specify that the ANDSF policy includes a WLAN selection parameter including a location of the UE or a time of day.

Example 25 may include the subject matter of examples 22 or 23, and further specify that the ANDSF policy includes an inter-system mobility policy (ISMP) or an inter-system routing policy (ISRP).

Example 26 may include the subject matter of examples 22 or 23, and further specify that the ANDSF policy is a third generation partnership project (3GPP) ANDSF policy.

Example 27 may include the subject matter of examples 22 or 23, and further specify that the instructions, upon execution by the computing device, further cause the computing device to receive the ANDSF policy from an operator of a home network of the UE.

Example 28 may include the subject matter of examples 22 or 23, and further specify that the instructions, upon execution by the computing device, further cause the computing device to receive the ANDSF policy from an operator of a roaming network of the UE.

Example 29 may include one or more computer readable media including instructions to construct an access network discovery and selection function (ANDSF) policy, the instructions to, upon execution of the instructions by an ANDSF server, cause the ANDSF server to: construct an ANDSF policy that includes: a plurality of service set identifiers (SSIDs) of a plurality of access points (APs) of a plurality of wireless location area networks (WLANs); a WLAN selection parameter; and an instruction for a user equipment (UE) to connect to an access point associated with an SSID of the plurality of SSIDs according to the respective priorities of each SSID; and transmit the ANDSF policy to the UE.

Example 30 may include the subject matter of example 29, and further specify that the ANDSF server is an ANDSF server of a home network of the UE.

Example 31 may include the subject matter of example 29, and further specify that the ANDSF server is an ANDSF server of a visited network of the UE.

Example 32 may include the subject matter of any of examples 29-31, and further specify that the WLAN selection parameter includes a location of the WLAN, a time of day, or load on a wireless network.

Example 33 may include the subject matter of any of examples 29-31, and further specify that the ANDSF policy is an inter-system mobility policy (ISMP) or an inter-system routing policy (ISRP).

Example 34 may include the subject matter of any of examples 29-31, and further specify that the ANDSF policy is a third generation partnership project (3GPP) ANDSF policy.

Example 35 may include a method of constructing an access network discovery and selection function (ANDSF) policy, the method including: constructing an ANDSF policy that includes: a plurality of service set identifiers (SSIDs) of a plurality of access points (APs) of a plurality of wireless location area networks (WLANs); a WLAN selection parameter; and an instruction for a user equipment (UE) to connect to an access point associated with an SSID of the plurality of SSIDs according to the respective priorities of each SSID; and transmitting the ANDSF policy to the UE.

Example 36 may include the subject matter of example 35, and further specify that the ANDSF server is an ANDSF server of a home network of the UE.

Example 37 may include the subject matter of example 35, and further specify that the ANDSF server is an ANDSF server of a visited network of the UE.

Example 38 may include the subject matter of any of example 35-37, and further specify that the WLAN selection parameter includes a location of the WLAN, a time of day, or load on a wireless network.

Example 39 may include the subject matter of any of example 35-37, and further specify that the ANDSF policy is an inter-system mobility policy (ISMP) or an inter-system routing policy (ISRP).

Example 40 may include the subject matter of any of example 35-37, and further specify that the ANDSF policy is a third generation partnership project (3GPP) ANDSF policy.

Example 41 may include an apparatus to construct an access network discovery and selection function (ANDSF) policy, the apparatus including: means to construct an ANDSF policy that includes: a plurality of service set identifiers (SSIDs) of a plurality of access points (APs) of a plurality of wireless location area networks (WLANs); a WLAN selection parameter; and an instruction for a user equipment (UE) to connect to an access point associated with an SSID of the plurality of SSIDs according to the respective priorities of each SSID; and means to transmit the ANDSF policy to the UE.

Example 42 may include the subject matter of example 41, and further specify that the ANDSF server is an ANDSF server of a home network of the UE.

Example 43 may include the subject matter of example 41, and further specify that the ANDSF server is an ANDSF server of a visited network of the UE.

Example 44 may include the subject matter of any of examples 41-43, and further specify that the WLAN selection parameter includes a location of the WLAN, a time of day, or load on a wireless network.

Example 45 may include the subject matter of any of examples 41-43, and further specify that the ANDSF policy is an inter-system mobility policy (ISMP) or an inter-system routing policy (ISRP).

Example 46 may include the subject matter of any of examples 41-43, and further specify that the ANDSF policy is a third generation partnership project (3GPP) ANDSF policy.

Example 47 may include an apparatus to construct an access network discovery and selection function (ANDSF) policy, the apparatus including: a processor to construct an ANDSF policy that includes: a plurality of service set identifiers (SSIDs) of a plurality of access points (APs) of a plurality of wireless location area networks (WLANs); a WLAN selection parameter; and an instruction for a user equipment (UE) to connect to an access point associated with an SSID of the plurality of SSIDs according to the respective priorities of each SSID; and a transceiver to transmit the ANDSF policy to the UE.

Example 48 may include the subject matter of example 47, and further specify that the ANDSF server is an ANDSF server of a home network of the UE.

Example 49 may include the subject matter of example 47, and further specify that the ANDSF server is an ANDSF server of a visited network of the UE.

Example 50 may include the subject matter of any of examples 47-49, and further specify that the WLAN selection parameter includes a location of the WLAN, a time of day, or load on a wireless network.

Example 51 may include the subject matter of any of examples 47-49, and further specify that the ANDSF policy is an inter-system mobility policy (ISMP) or an inter-system routing policy (ISRP).

Example 52 may include the subject matter of any of examples 47-49, and further specify that the ANDSF policy is a third generation partnership project (3GPP) ANDSF policy.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such element. Further, ordinal indicators (e.g., first, second or third) for identified elements are used to distinguish between the element, and do not indicate or imply a required or limited number of such elements, nor do they indicate a particular position or order of such elements unless otherwise specifically stated.

What is claimed is:

1. A user equipment (UE) comprising:
a network selection module to access an access network discovery and selection function (ANDSF) policy;
a communication module coupled with the network selection module, the communication module to:
receive an indication of a wireless local area network (WLAN) access point (AP) of a WLAN that interworks with a visited operator of a visited public land mobile network (VPLMN) of the UE; and
transmit a request to connect the UE to the WLAN AP of the WLAN that interworks with the visited operator based at least in part on the ANDSF policy.

2. The UE of claim 1, wherein the ANDSF policy is an ANDSF policy of a home operator of a home public land mobile network (HPLMN) of the UE.

3. The UE of claim 1, wherein the ANDSF policy is an ANDSF policy of the visited operator.

4. The UE of claim 1, wherein the communication module is further to transmit a request to connect to the VPLMN based at least in part on the ANDSF policy.

5. The UE of claim 1, wherein the ANDSF policy comprises a WLAN selection parameter comprising location of the UE, a time of day, or load on a home public land mobile network (HPLMN) of the UE.

6. The UE of claim 1, wherein the ANDSF policy comprises an inter-system mobility policy (ISMP) or an inter-system routing policy (ISRP).

7. The UE of claim 1, wherein the UE further comprises a power supply coupled with the network selection module.

8. A method comprising:
accessing, by a user equipment (UE), an access network discovery and selection function (ANDSF) policy;
receiving, by the UE, an indication of a wireless local area network (WLAN);
selecting, by the UE and based at least in part on the ANDSF policy, the WLAN as a selected WLAN
receiving, by the UE, an indication of a public land mobile network (PLMN);
identifying, by the UE, interworking between the WLAN and the PLMN; and
selecting, by the UE and based at least in part on the selected WLAN and the interworking, the PLMN.

9. The method of claim 8, wherein the indication of the WLAN is a service set identifier (SSID) of an access point (AP) of the WLAN.

10. The method of claim 8, wherein the ANDSF policy comprises a WLAN selection parameter comprising a location of the UE or a time of day.

11. The method of claim 8, wherein the ANDSF policy comprises an inter-system mobility policy (ISMP) or an inter-system routing policy (ISRP).

12. The method of claim 8, wherein the ANDSF policy is a third generation partnership project (3GPP) ANDSF policy.

13. The method of claim 8, further comprising receiving, by the UE, the ANDSF policy from an operator of a home network of the UE.

14. The method of claim 8, further comprising receiving, by the UE, the ANDSF policy from an operator of a roaming network of the UE.

15. One or more non-transitory computer readable media comprising instructions to, upon execution of the instructions by an access network discovery and selection function (ANDSF) server, cause the ANDSF server to:
construct an ANDSF policy that includes:
a plurality of service set identifiers (SSIDs) of a plurality of access points (APs) of a plurality of wireless local area networks (WLANs);
a WLAN selection parameter; and
an instruction for a user equipment (UE) to connect to an access point associated with an SSID of the plurality of SSIDs according to the respective priorities of each SSID; and
transmit the ANDSF policy to the UE.

16. The one or more non-transitory computer readable media of claim 15, wherein the ANDSF server is an ANDSF server of a home network of the UE.

17. The one or more non-transitory computer readable media of claim 15, wherein the ANDSF server is an ANDSF server of a visited network of the UE.

18. The one or more non-transitory computer readable media of claim 15, wherein the WLAN selection parameter comprises a location of the WLAN, a time of day, or load on a wireless network.

19. The one or more non-transitory computer readable media of claim 15, wherein the ANDSF policy is an inter-system mobility policy (ISMP) or an inter-system routing policy (ISRP).

20. The one or more non-transitory computer readable media of claim 15, wherein the ANDSF policy is a third generation partnership project (3GPP) ANDSF policy.

* * * * *